Feb. 1, 1949.  A. G. STIMSON  2,460,773
TEMPERATURE SENSITIVE VARIABLE INDUCTANCE
Filed Dec. 8, 1944
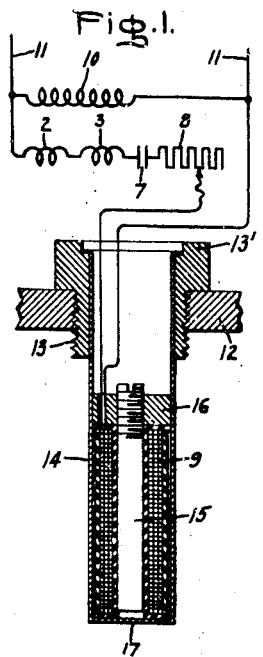
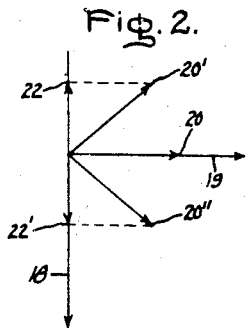
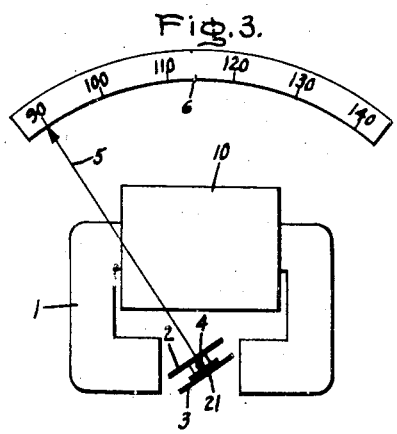
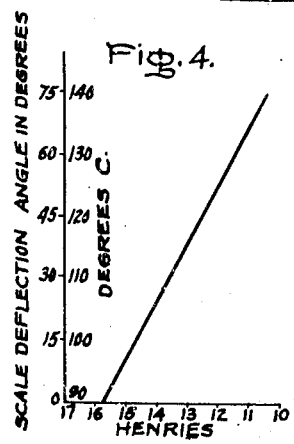
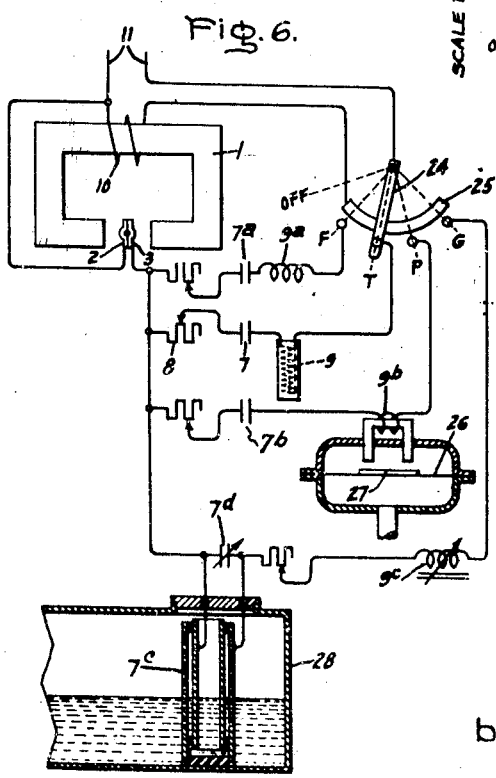
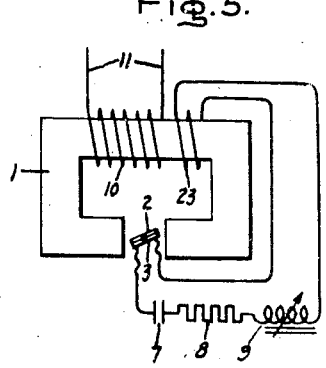
Inventor:
Allen G. Stimson,
by Harry E. Dunham
His Attorney.

Patented Feb. 1, 1949

2,460,773

UNITED STATES PATENT OFFICE 2,460,773

TEMPERATURE SENSITIVE VARIABLE INDUCTANCE

Allen G. Stimson, Lynnfield, Mass., assignor to General Electric Company, a corporation of New York Application December 8, 1944, Serial No. 567,172

1 Claim. (Cl. 171—777)

My invention relates primarily to a method of, and apparatus for, measuring temperature wherein a temperature sensitive variable inductance is used in a tuned instrument circuit in such a manner that changes in the inductance in response to temperature variations are measured in terms of the temperature to which the inductance is subjected. It will be observed that since the measurement responds to a variation in the tuning of a tuned circuit, a broader aspect of my invention concerns a method and apparatus for measuring variations in a tuning device of the circuit, such as a capacitance or inductance, regardless of the cause of the variation. However, the invention is particularly suited for measuring temperature.

The features of my invention which are believed to be novel and patentable will be pointed out in the claim appended hereto. For a better understanding of my invention, reference is made in the following description to the accompanying drawing in which Fig. 1 represents an improved circuit arrangement and circuit elements for the measurement of temperature. Fig. 2 is a vector diagram explanatory of the theory of operation of the tuned instrument circuit of Fig. 1. Fig. 3 is a diagrammatic representation of the instrument used with my invention. Fig. 4 is a curve showing variations in instrument deflections for variations in the temperature being measured. Fig. 5 shows a modification of the instrument circuit useful for compensating the measuring system for variations in ambient temperature at the measuring instrument itself, and Fig. 6 repersents a measuring system arranged so as to be switched to a plurality of different phase shifting circuit elements for the alternate measurement of a plurality of different quantities using the same instrument and source of supply.

First, I will explain the theory of operation of my measuring system in connection with Figs. 1, 2, and 3. The instrument has a stationary U-shaped magnetic core 1 energized by a voltage coil and a moving armature having a winding split into two coaxial coils 2 and 3 mounted on either side of the armature shaft 4, and a pointer 5 cooperating with a scale 6. The connections for measuring temperature are shown in Fig. 1 where it is seen that the armature coils are connected in series and, except for the split arrangement to balance the coil assembly with respect to the shaft, might be considered as a single coil, since they are connected to produce flux in the same axial direction simultaneously. The armature circuit includes a condenser 7, a variable resistance 8, and a temperature sensitive variable inductance coil 9. The armature circuit thus comprised is connected in parallel with the field coil 10 across a source of constant frequency alternating current supply 11. An instrument and circuit of this character, except using a constant inductance and variable frequency, are described in my copending application, Serial No. 539,546, filed June 9, 1944, now Patent No. 2,411,010, issued November 12, 1946, for the measurement of frequency.

The temperature sensitive inductance may be in the form of a unit that is adapted to be placed at the point where the temperature is to be measured so as to conform to such temperature. In the illustration the unit is in the form of a plug that may be screwed into a tank or other liquid or gaseous container, the wall of which is represented at 12. The head of the plug is in the form of a hollow bolt 13 having a wrench fitting head 13'. Sealed into the hollow bolt is a thin walled tube 14 made of a magnetic material, the permeability of which changes with temperature. Alloys of iron and nickel called Curie alloy have a negative temperature coefficient of permeability and are suitable for this purpose. Also alloys of iron, copper, and nickel, such as described in United States Patent No. 1,706,172 to Kinnard, may be used. The particular alloy to be used in any given case will depend very largely upon the range of temperature variation to be measured, and I do not wish to confine my invention to any particular alloy or material in this respect. The tube 14 is closed at its inner end by the same material. Fixed in the tube is the coil 9 previously mentioned, which coil is wound about a core 15 of magnetic material, which core is shown threaded through a nut 16 fixed in the tube 14 with a sufficiently tight fit or otherwise so that it will not move. The nut 16 is also of magnetic material. The coil 9, core 15, and nut 16 are coaxial with respect to the tube 14, and the magnetic parts form a magnetic circuit for the flux of the coil, which magnetic circuit is closed except for an air gap between the end of the core 15 and the closed end wall of the tube at 17. This gap may be adjusted by inserting a screwdriver into the hollow head of the plug and turning the core 15 in the fixed nut 16. Temperature responsive inductance units may be used with a fixed gap or no gap at all. However, the structure shown and described affords a handy means of adjusting the inductance for calibration purposes.

Where the temperature changes to be measured are sufficiently slow so that the core part 15 will conform thereto, it also may be made of a material having a negative temperature coefficient of permeability, and in such instances the two materials used in parts 14 and 15 may be different and selected with a view to extending the temperature range of performance or to straighten the inductance-temperature variation curve, etc. Where the unit is used to measure temperature variations which fluctuate rapidly, the core 15 will preferably be made of iron or steel and will have a constant permeability, and the tubular part 14 which is exposed directly to the gas or liquid, the temperature of which is to be measured and can change its temperature rapidly, will be made of the temperature sensitive material. Thus I have here provided an inductance the value of which decreases with rise in temperature and increases with a fall in temperature as the permeability of a substantial portion of its magnetic circuit decreases and increases with rise and fall in temperature, respectively. This variable inductance involves no moving parts in its operation and can be built in a variety of forms and shapes suitable for a wide variety of applications and at low cost.

Referring now to Figs. 1 and 2, the field coil 10 is of high inductance and its current represented by vector 18, Fig. 2, lags approximately 90 degrees behind the applied voltage represented by vector 19. The armature circuit is tuned and the phase angle of its current varies with changes in the inductance unit having the coil 9 which, as previously described, varies with the temperature of such unit. Preferably at a mid-temperature range of the inductance or the mid-temperature range to be measured, the armature circuit is tuned for resonance so that its current represented by vector 20 is in phase with the field voltage 19 at this time. Such tuning may be had by a proper selection of the capacitance 7 and the inductance and by adjusting the air gap of such inductance at 17, while the inductance is maintained at the selected temperature. Since by such tuning, vector 20 is 90 degrees out of phase with the field current vector 18, no torque due to the current flow will be present at this time. The armature, however, is provided with a tiny magnetic vane 21 positioned with its magnetic axis at right angles to the axis of the armature coils, which vane is attracted by the flux of field magnet 1 across the armature gap and positions the armature so that its coil axis is at right angles to the field flux axis across the gap under these conditions, and at this time the pointer 5 is positioned to read near the center of the scale 6, and this point on the scale is graduated at the temperature selected for this resonance condition of the circuit. The lead-in spirals to the armature coils preferably do not produce torque sufficient to influence the armature position in the modification described.

Now when the temperature at the inductance increases, the inductance becomes less because of the increase in reluctance of its magnetic circuit, and the armature current will lead the voltage 19, as represented by the vector 20', Fig. 2, and an instrument torque will exist, producing a deflection. Since it is desirable for this deflection to be up-scale, if it is not in the up-scale direction, it can be made so by reversing either the field or armature connections of the instrument. Such up-scale torque is represented by the vector 22, and such torque and the corresponding deflection will be proportional to the increase in temperature at the inductance. When the temperature at the inductance goes below the selected mid-range temperature, the value of the inductance will increase because of the lower reluctance of its magnetic circuit and the armature current will lag the voltage 19, as represented by vector 20'', producing a down-scale torque represented by vector 22', Fig. 2. The magnitude of this up-scale and down-scale torque for given temperature changes at the inductance and for a given armature current may be increased or decreased by reducing or increasing, respectively, the value of the resistance 8 as compared to the values of the condenser and inductance used. Hence, within limits the deflection range may be expanded or contracted for a given range of the measurement temperature variation by decreasing or increasing such resistance. A similar result may be had by reducing or increasing the center restoring torque produced by the magnetic vane 21, and the vane is preferably made adjustable for such initial calibration purposes. After having arrived at a desired condition in these respects, the scale of the instrument is calibrated in temperature units so as to indicate the measurement temperature. It will be evident that the centering torque produced by the magnetic vane increases and decreases with voltage variations of the source 11 and compensates for changes in instrument torque occasioned by voltage variations, so that the instrument operation is substantially independent of ordinary voltage variations of the source of supply.

While there will be slight changes in resistance of the coil 9 with changes in the measurement temperature, assuming copper wire is used, for example, the effect of such change in resistance will always be the same for the same temperature, and hence, is included in the calibration of the instrument and does not produce any error.

In Fig. 4 there is a curve showing the temperature variations in degrees centigrade of the inductance 9 and the resulting changes in such inductance given in henries. The curve also shows the resulting scale deflection of the instrument. The composition of the tube 14 for this particular curve was 36% nickel, 59% iron, and 5% manganese. Other temperature ranges of measurement may be had by using other alloys. For example, for a temperature range between 140 and 195 degrees C., an alloy of 36% nickel, 61% iron, and 3% manganese could be used.

In Fig. 5, I have shown a modification in the manner of energizing the tuned instrument circuit which may be used to advantage in cases where there is a sufficient variation in temperature of the indicating instrument itself as to require its compensation. In case the coil 10 is made of copper, it will have an appreciable resistance change with changes in temperature. Hence, its time constant will change and result in a small shift in phase of the flux produced thereby. To prevent error there should be a corresponding shift in the phase of the exciting voltage of the tuned armature circuit. This is accomplished in Fig. 5 by exciting the tuned armature circuit by transformer action from a secondary coil 23 on the core 1, the field coil 10 acting as the primary of such transformer. The change in tuning of the armature circuit has an insignificant influence on the phase of the field current and flux; hence, the field and armature circuits may be considered as connected in parallel relation. Hence, with this arrangement, if there is a shift in phase of the flux produced by coil 10, there will be a corresponding shift in the phase of the voltage used to excite the tuned armature circuit and no error will result.

In Fig. 6, I have shown my instrument and circuit adapted to be used selectively for a number of different purposes, selected by a multiple position switch 24. The switch position shown and designated T connects the instrument for the temperature measurement application previously described where the condenser 7 and the temperature sensitive inductance unit 9 are connected in series with the armature coils 2 and 3 and comprising the tuned circuit. The switch 24 is provided with a terminal 25 common to all energizing positions for connecting the field coil 10 of the instrument across the line. The switch will have an off position where all circuits are open.

In order to check the frequency of the source of supply, there is provided a tuned circuit having fixed capacitance 7a and fixed inductance 9a, which may be connected in series with the armature when the switch is thrown to the position contact designated F. In this position the circuit is so tuned that when the frequency is correct, the instrument has a predetermined calibrated indication for example, midscale. If such indication is not obtained with this connection, then it is apparent that the frequency is incorrect and should be corrected before other measurements are attempted.

In the third switch position from the left, designated P, the tuned armature circuit includes a fixed condenser 7b and a variable inductance 9b. The inductance 9b is arranged to be varied in response to pressure changes in a pressure unit containing a resilient diaphragm 26 on which is mounted a magnetic armature 27 opposite the air gap in the magnetic circuit of inductance unit 9b. Changes in pressure on opposite sides of the diaphragm vary the air gap and thus vary the inductance and change the tuning of the circuit, and the instrument is suitably calibrated to indicate pressure for this connection. When the switch 24 is thrown to the right-hand contact, designated G, the armature circuit is connected in series with a variable condenser 7c and a fixed inductance 9c. If found desirable for calibration purposes, a second adjustable condenser 7d may be used in parallel with condenser 7c. Condenser 7c comprises a pair of cylinder plates of slightly different size in telescoped relation and insulated from each other and positioned vertically in a gasoline tank 28, and extending from top to bottom therein. The outer cylinder is perforated so that any gasoline in the tank may enter the space between the condenser plates to the depth of the gasoline in the tank. Air and gasoline have different dielectric constants and hence, variation of the depth of the gasoline varies the capacitance of the condenser 7c and so changes the tuning of the armature circuit. By suitable calibration the instrument scale may now read in terms of the amount of gasoline in tank 28 or the depth in inches. If desired, the instrument may have a different scale for each of the several measurements.

Fig. 6 thus illustrates the versatility of the invention and its use for many different purposes.

What I claim as new and desire to secure by Letters Patent of the United States, is:

A temperature sensitive variable inductance comprising a tubular member of magnetic material closed at one end by magnetic material and open at the opposite end, a central core member of magnetic material within the tubular member, a coil contained within the tubular member and surrounding the central core, said core being magnetically connected to the tubular member at one end of the coil and adjustable axially within the tubular member towards and away from the closed end thereof at the other end of the coil, said parts forming an adjustable air gap magnetic circuit for the flux of the coil, a substantial portion of the magnetic material of said circuit having an appreciable temperature coefficient of permeability, said core being accessible through the open end of the tubular member for adjustment of the air gap to vary the value of the inductance at a given temperature, and an externally threaded sleeve surrounding the open end portion of the tubular member whereby the same may be threaded through a wall.

ALLEN G. STIMSON.

REFERENCES CITED

The following references are of record in the file of this patent:

UNITED STATES PATENTS

| Number | Name | Date |
|---|---|---|
| 787,738 | Eastwood | Apr. 18, 1905 |
| 1,048,930 | Beighlee | Dec. 31, 1912 |
| 1,217,327 | Romain | Feb. 27, 1917 |
| 1,355,041 | Harlow | Oct. 5, 1920 |
| 1,444,771 | Baker | Feb. 13, 1923 |
| 1,658,449 | Loffler | Feb. 7, 1928 |
| 1,674,482 | Rich | June 19, 1928 |
| 1,858,293 | Darlington | May 17, 1932 |
| 1,863,936 | Schwager | June 21, 1936 |
| 2,125,151 | Boekels | July 26, 1938 |
| 2,147,012 | Cousins | Feb. 14, 1939 |
| 2,191,151 | Hale | Feb. 20, 1940 |
| 2,208,910 | Pampel et al. | July 23, 1940 |
| 2,294,759 | Morack | Sept. 1, 1942 |
| 2,350,329 | Hornfeck | June 6, 1944 |
| 2,411,010 | Stimson | Nov. 12, 1946 |
| 2,414,224 | Douglas | Jan. 14, 1947 |

FOREIGN PATENTS

| Number | Country | Date |
|---|---|---|
| 319,061 | Great Britain | Sept. 16, 1929 |
| 397,918 | Great Britain | Sept. 4, 1933 |
| 556,189 | France | Apr. 9, 1923 |
| 824,981 | France | Nov. 27, 1937 |

OTHER REFERENCES

Pages 250, 251, 252, and 280 of May, 1943, issue of Instruments, vol. 16.